Nov. 5, 1940.    W. T. THORNE    2,220,302
TROLLING PLANER
Filed Jan. 9, 1939

William Thomas Thorne,
Inventor.
By David E. Lain,
Attorney.

Patented Nov. 5, 1940

2,220,302

UNITED STATES PATENT OFFICE 2,220,302

TROLLING PLANER

William Thomas Thorne, Saanichton, British Columbia, Canada

Application January 9, 1939, Serial No. 249,832

3 Claims. (Cl. 43—49)

My invention relates to the art of fishing tackle, as used for deep sea fishing and is particularly adapted as a trolling planer.

In deep sea fishing, whether with a rod or by means of lines secured to a boat, it is customary and necessary either to employ heavy lead sinkers—whose weight is proportional to the speed of the boat and the depth at which it is desired to maintain the lure, or some form of otter or planer of a type and design such that it will cause the lure to remain at any desired depth in the water.

One disadvantage of the former method is that when a fish is caught the work of pulling it in is very greatly increased, on account of the extra weight of the attached lead sinker.

Various planers and otters have been devised to obviate this disadvantage, and many and complicated devices have been employed which, when a fish has taken the hook, will trip or release the angle at which the planer is set, so that it offers a comparitively small resistance when hauling in the fish.

In practise however it frequently happens that the tripping mechanism of these planers will be released, without a fish actually being caught, either by the hook contacting some submerged object, a fish "striking" without actually being caught, or some other reason, with the result that the whole amount of line will have to be reeled in, and the planer reset, otherwise the lure will come to the surface.

As a result, a considerable amount of time is lost, and annoyance caused to the fisherman.

The main object of my invention is to provide a planer which after being accidentally released, may readily be reset by the fisherman without having to be reeled in to the boat.

Another object is to provide a planer simple of construction, and inexpensive to manufacture, with a very small number of moving parts to go out of adjustment.

A further object of my invention is to provide a planer which, by reason of its lightness, may be more readily handled than the sinkers and planers now commonly used.

Still further objects reside in design and colour of my planer, which in addition to the uses above outlined functions as a lure to attract fish.

Other objects of my device will be apparent from the following description taken in conjunction with the drawing in which:

Figure 1 illustrates a side elevation of the trolling planer while

Figure 1:
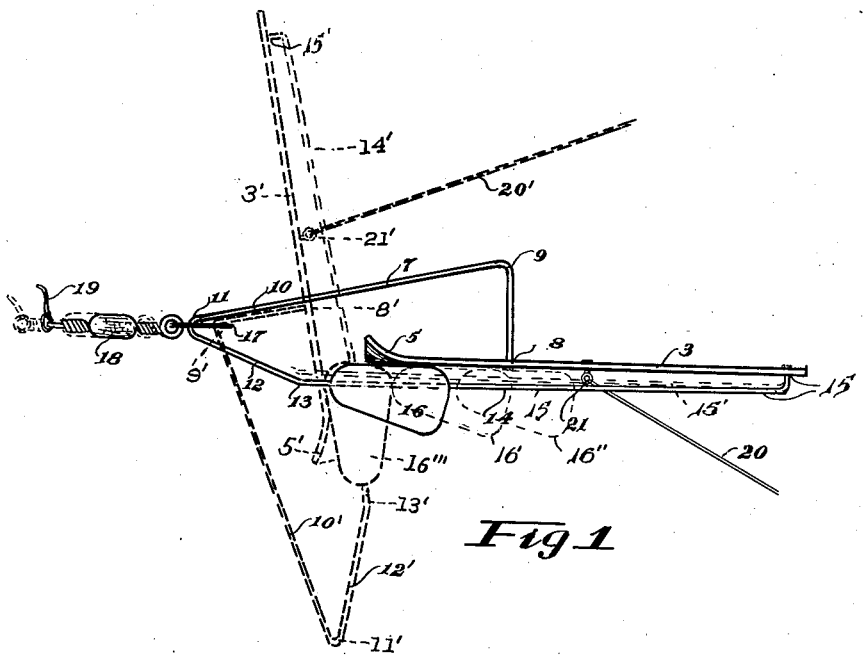
Figure 2:
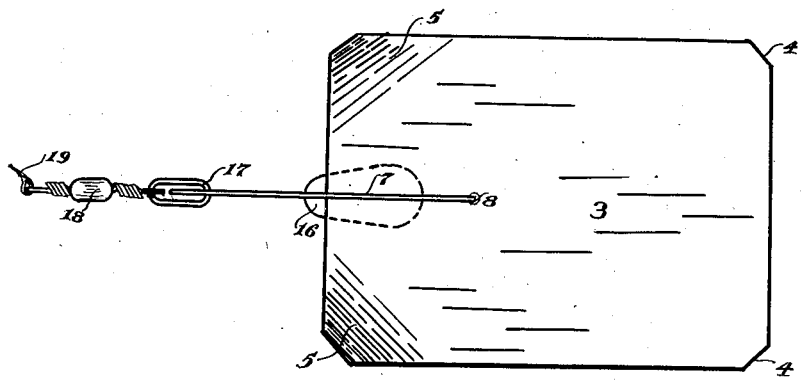
Figure 2 is a plan view of the same.

Referring more particularly to the drawing wherein like numerals identify identical parts, the numeral 3 designates the rectangular plane sheet of white Celluloid or Bakelite, whose corners are cut away at 4. The forward corners are curved upward at 5, to prevent the plane sheet from revolving while being towed in the water. This bow-shaped front also eliminates any tendency in the planer to wander or vibrate.

A salient feature of my invention consists of the trip-rod member 7, which encircles the forward portion of the planer body 3, and extends from the mounting 8, vertically to the acute angle 9. The continuation 10 extends beyond the front of the planer 3 to the angular loop 11 and is carried downwards at 12 to a point substantially just in front of the planer at 13, thence continues parallel at 14 with the longitudinal axis of the planer and is rigidly secured at 15.

A metallic sinker 16 is adjustably mounted on the section of the arm denoted by the numeral 14 with its upper surface pressing against the bottom surface of the planer 3 with sufficient pressure to cause enough friction to retain the sinker in adjusted positions at 16' or 16" in Figure I. The arm 15 is shown in solid lines disposed in that position by the presence of the sinker 16 between the arm and the bottom surface of the plane 3. When the sinker is not in said position the arm 15 is disposed in its dotted line position at 15'. The resilience of the arm 15 retains the sinker in frictional contact with the plane 3 and tends to keep it in desired positions of adjustment.

The elongated link 17 is shown in solid lines in a slack position relative to loop 11, and in a trailing position in dotted lines at 17' encircles the rod 7 and carries a swivel 18, which is connected to the trolling line 19, the lure-carrying line 20 being secured to the under surface of the planer body at 21.

In the drawing Figure 1 shows the plane sheet 3 in solid lines being towed through the water in the tripped position, while the dotted lines indicate the position taken by the plane sheet 3 at 3' the loop end 15 at 15', the loop part 10 at 10', the loop part 12, at 12', the sinker at 16''' and the line 20 at 20' when reset, and offering a maximum of resistance to the water.

In operation, the sinker is set at the correct position for the requisite depth, and balance. The planer and a sufficient quantity of line is then run out. If the elongated loop 17 is at the forward angle 11, shown in dotted lines at 14', the fisherman will be cognisant of this fact by the lack of resistance offered by the planer. He will then slacken the line momentarily, when the momentum of the planer will carry it forward and downward and slide the elongated loop 17 back to the angle 9, thus setting the planer in position.

In this position the inclination of the surface of the planer body 3 to the horizontal plane will impel it in a forward and downward direction; the actual depth reached in the water being of course dependent on the amount of line reeled off by the fisherman, the speed at which the planer is being towed and the position and weight of the attached sinker.

When a fish strikes, the strain on the line 20 will cause the planer body 3 to tilt backwards, and thus raise the forward angle 11, when the loop 17 will travel forwards, thus changing the angle at which the planer is being towed and reducing its resistance to a minimum.

Should the planer be accidentally tripped, due to the hook striking a submerged object, or any other cause, the mechanism may be reset, as first described.

The depth at which it is desired to maintain the planer in the water is dependent on the position of the sinker 16 on the rod 14, the amount of line used, and the speed at which it is drawn through the water.

From the above it will be seen that a planer device for trolling is provided which may be submerged at any desired depth in the water, that may be automatically tripped when a fish is caught, so that little or no resistance is offered to be added to the weight of the fish hauled in, and which may always be reset without the necessity of hauling in a long line.

The invention having been set forth what is claimed as new and useful is:

1. A trolling planer including, a rectangular plane sheet of solid material, a wire loop both ends of which are fastened to said plane sheet, the said loop containing a trolling line angle more distant from said plane sheet than a second trolling line angle said more distant trolling line angle being adapted to engage a trolling line for drawing the plane sheet endwise through the water, the said second trolling line angle adjacent said plane sheet being adapted to engage said trolling line for drawing said plane sheet flatwise through the water when said trolling line is disengaged from said more distant angle by reducing the rate of movement of said trolling planer through the water, a sinker having a hole therein through which said wire is extended, said sinker being disposed beneath said plane sheet in frictional engagement with said sheet and retained thereby in desired locations on said wire, and means on said plane sheet for the fastening thereon of a fishing lure and hook line.

2. A trolling planer including, a rectangular plane sheet of solid material having its front corners bent upwardly, a wire loop having its ends fastened to said plane sheet, the said wire loop containing a trolling line angle more distant from the said plane sheet than a second trolling line angle, said more distant trolling line angle being adapted to engage a link attached to a trolling line to draw said plane sheet endwise through the water, the said second trolling line angle adjacent said plane sheet being adapted to engage said trolling line link when automatically disengaged from said more distant trolling line angle by the diminished rate of movement of said trolling planer through the water and thereby drawing said plane sheet flatwise through the water, a sinker having a hole therein through which said wire is extended, said sinker being disposed beneath said plane sheet in frictional engagement with said sheet and retained thereby by said frictional engagement in desired locations on said wire, and means on said plane sheet for fastening thereon a fishing lure and hook line.

3. A trolling planer including, a rectangular plane sheet of solid material having its front corners bent upwardly, a wire loop having its ends fastened to said plane sheet, the said wire loop containing a trolling line angle more distant from the said plane sheet than a second trolling line angle, said more distant trolling line angle being adapted to engage a swivel-carrying an elongated link attached to a trolling line to draw said plane sheet endwise through the water, the said second trolling line angle adjacent said plane sheet being adapted to engage said trolling line link when automatically disengaged from said more distant trolling line angle by the diminished rate of movement of said trolling planer through the water for drawing said plane sheet flatwise through the water, a sinker having a hole therein through which said wire is extended, said sinker being disposed in frictional engagement with said plane sheet and retained in desired locations thereby on said wire, and means on said plane sheet for fastening thereon a fishing lure and hook line.

WILLIAM THOMAS THORNE.